(12) United States Patent
Bultje et al.

(10) Patent No.: US 9,179,151 B2
(45) Date of Patent: Nov. 3, 2015

(54) SPATIAL PROXIMITY CONTEXT ENTROPY CODING

(71) Applicant: Google Inc., Mountain View, CA (US)

(72) Inventors: Ronald Sebastiaan Bultje, San Jose, CA (US); Debargha Mukherjee, Cupertino, CA (US); Yaowu Xu, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 16 days.

(21) Appl. No.: 14/057,554

(22) Filed: Oct. 18, 2013

(65) Prior Publication Data

US 2015/0110409 A1    Apr. 23, 2015

(51) Int. Cl.
| | |
|---|---|
| G06K 9/36 | (2006.01) |
| G06K 9/46 | (2006.01) |
| H04N 19/13 | (2014.01) |
| H04N 19/129 | (2014.01) |
| H04N 19/91 | (2014.01) |

(52) U.S. Cl.
CPC .............. *H04N 19/13* (2014.11); *H04N 19/129* (2014.11); *H04N 19/91* (2014.11)

(58) Field of Classification Search
None
See application file for complete search history.

(56) References Cited

U.S. PATENT DOCUMENTS

| | | |
|---|---|---|
| 4,710,810 A | 12/1987 | Koga |
| 5,150,209 A | 9/1992 | Baker et al. |
| 5,260,783 A | 11/1993 | Dixit |
| 5,461,423 A | 10/1995 | Tsukagoshi |
| 5,650,782 A | 7/1997 | Kim |
| 5,686,962 A | 11/1997 | Chung et al. |

(Continued)

FOREIGN PATENT DOCUMENTS

| | | |
|---|---|---|
| EP | 1351510 | 10/2003 |
| EP | 1768415 | 3/2007 |

(Continued)

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.

(Continued)

*Primary Examiner* — Bhavesh Mehta
*Assistant Examiner* — Feng Niu
(74) *Attorney, Agent, or Firm* — Young Basile Hanlon & MacFarlane P.C.

(57) ABSTRACT

Encoding and decoding using spatial proximity context entropy coding may include identifying a plurality of transform coefficients for a current block of a current frame of a video stream. The plurality of transform coefficients may be ordered based on a scan order. A current transform coefficient may be identified from the plurality of transform coefficients. A plurality of context coefficients may be identified from the plurality of transform coefficients. Each context coefficient may be spatially proximate to the current transform coefficient and may be available for entropy coding the current transform coefficient. An entropy coding probability for the current transform coefficient may be identified based on the scan order and the plurality of context coefficients. The current transform coefficient may be entropy coded based on the entropy coding probability. The entropy coded current transform coefficient may be included in an output bitstream, which may be stored or transmitted.

19 Claims, 12 Drawing Sheets

(56) References Cited

U.S. PATENT DOCUMENTS

| | | |
|---|---|---|
| 5,708,473 A | 1/1998 | Mead |
| 5,767,909 A | 6/1998 | Jung |
| 5,777,680 A | 7/1998 | Kim |
| 5,818,536 A | 10/1998 | Morris et al. |
| 5,886,652 A | 3/1999 | Adachi et al. |
| 6,125,144 A | 9/2000 | Matsumura et al. |
| 6,157,326 A | 12/2000 | Van Der Vleuten et al. |
| 6,212,234 B1 | 4/2001 | Andoh et al. |
| 6,256,423 B1 | 7/2001 | Krishnamurthy et al. |
| 6,314,208 B1 | 11/2001 | Konstantinides et al. |
| 6,414,995 B2 | 7/2002 | Okumura et al. |
| 6,418,166 B1 | 7/2002 | Wu et al. |
| 6,434,197 B1 | 8/2002 | Wang et al. |
| 6,473,463 B2 | 10/2002 | Agarwal |
| 6,501,860 B1 | 12/2002 | Charrier et al. |
| 6,522,784 B1 | 2/2003 | Zlotnick |
| 6,570,924 B1 | 5/2003 | Lynch et al. |
| 6,661,842 B1 | 12/2003 | Abousleman |
| 6,661,925 B1 | 12/2003 | Pianykh et al. |
| 6,856,701 B2 | 2/2005 | Karczewicz et al. |
| 6,907,079 B2 | 6/2005 | Gomila et al. |
| 6,917,651 B1 | 7/2005 | Yoo et al. |
| 6,985,527 B2 | 1/2006 | Gunter et al. |
| 7,010,032 B1 | 3/2006 | Kikuchi et al. |
| 7,085,425 B2 | 8/2006 | Christopoulos et al. |
| 7,116,831 B2 | 10/2006 | Mukerjee et al. |
| 7,226,150 B2 | 6/2007 | Yoshimura et al. |
| 7,432,329 B2 | 10/2008 | Haubennestel et al. |
| 7,496,143 B2 | 2/2009 | Schwarz et al. |
| 7,843,998 B2 | 11/2010 | Bjontegaard |
| 8,064,527 B2 | 11/2011 | Liu et al. |
| 8,116,373 B2 * | 2/2012 | Base et al. .............. 375/240.02 |
| 8,200,033 B2 | 6/2012 | Mietens et al. |
| 8,254,700 B1 | 8/2012 | Rastogi |
| 8,265,162 B2 | 9/2012 | Tian et al. |
| 8,270,738 B2 | 9/2012 | Raveendran et al. |
| 8,311,119 B2 | 11/2012 | Srinivasan |
| 8,331,444 B2 | 12/2012 | Karczewicz et al. |
| 8,344,917 B2 | 1/2013 | Misra et al. |
| 8,374,445 B2 | 2/2013 | Benndorf |
| 8,401,083 B2 | 3/2013 | Crotty et al. |
| 8,938,001 B1 | 1/2015 | Bankoski et al. |
| 2001/0022815 A1 | 9/2001 | Agarwal |
| 2002/0009153 A1 | 1/2002 | Jeon et al. |
| 2002/0036705 A1 | 3/2002 | Lee et al. |
| 2002/0071485 A1 | 6/2002 | Caglar et al. |
| 2002/0080871 A1 | 6/2002 | Fallon et al. |
| 2003/0081850 A1 | 5/2003 | Karczewicz et al. |
| 2003/0215018 A1 | 11/2003 | MacInnis et al. |
| 2003/0227972 A1 | 12/2003 | Fukuda |
| 2004/0013308 A1 | 1/2004 | Jeon et al. |
| 2004/0120398 A1 | 6/2004 | Zhang et al. |
| 2004/0131117 A1 | 7/2004 | Sheraizin et al. |
| 2004/0151252 A1 * | 8/2004 | Sekiguchi et al. ....... 375/240.25 |
| 2004/0234144 A1 | 11/2004 | Sugimoto et al. |
| 2005/0123207 A1 | 6/2005 | Marpe et al. |
| 2005/0152459 A1 | 7/2005 | Lobo et al. |
| 2005/0180500 A1 | 8/2005 | Chiang et al. |
| 2005/0201470 A1 | 9/2005 | Sievers |
| 2005/0276323 A1 | 12/2005 | Martemyanov et al. |
| 2006/0001557 A1 | 1/2006 | Liao |
| 2006/0098738 A1 | 5/2006 | Cosman et al. |
| 2006/0126724 A1 | 6/2006 | Cote et al. |
| 2006/0203916 A1 | 9/2006 | Chandramouly et al. |
| 2007/0025441 A1 | 2/2007 | Ugur et al. |
| 2007/0127831 A1 | 6/2007 | Venkataraman |
| 2007/0136742 A1 | 6/2007 | Sparrell |
| 2007/0177673 A1 | 8/2007 | Yang |
| 2008/0170615 A1 | 7/2008 | Sekiguchi et al. |
| 2008/0181299 A1 | 7/2008 | Tian et al. |
| 2008/0310503 A1 | 12/2008 | Lee et al. |
| 2008/0310745 A1 | 12/2008 | Ye et al. |
| 2009/0175332 A1 | 7/2009 | Karczewicz et al. |
| 2009/0190659 A1 | 7/2009 | Lee et al. |
| 2010/0054328 A1 | 3/2010 | Nozawa |
| 2010/0097250 A1 | 4/2010 | Demircin et al. |
| 2010/0098169 A1 | 4/2010 | Budagavi |
| 2010/0290568 A1 | 11/2010 | Suzuki et al. |
| 2011/0080946 A1 | 4/2011 | Li et al. |
| 2011/0243225 A1 | 10/2011 | Min et al. |
| 2012/0020408 A1 | 1/2012 | Chen et al. |
| 2012/0082220 A1 | 4/2012 | Mazurenko et al. |
| 2012/0140822 A1 | 6/2012 | Wang et al. |
| 2012/0147948 A1 | 6/2012 | Sole et al. |
| 2012/0183052 A1 | 7/2012 | Lou et al. |
| 2012/0207222 A1 * | 8/2012 | Lou et al. ................. 375/240.18 |
| 2012/0236931 A1 | 9/2012 | Karczewicz et al. |
| 2012/0243605 A1 | 9/2012 | Turlikov et al. |
| 2012/0320978 A1 | 12/2012 | Ameres et al. |
| 2012/0328026 A1 | 12/2012 | Sole Rojals et al. |
| 2013/0003829 A1 | 1/2013 | Misra et al. |
| 2013/0027230 A1 | 1/2013 | Marpe et al. |
| 2014/0177708 A1 | 6/2014 | Alshin et al. |

FOREIGN PATENT DOCUMENTS

| | | |
|---|---|---|
| EP | 2235950 | 10/2010 |
| JP | 61092073 | 5/1986 |
| JP | 2217088 | 8/1990 |
| JP | 2272970 | 11/1990 |
| JP | 8280032 | 10/1996 |
| JP | 09247682 | 9/1997 |
| JP | 11262018 | 9/1999 |
| JP | 11289544 | 10/1999 |
| JP | 11313332 | 11/1999 |
| JP | 11513205 | 11/1999 |
| JP | 2002141806 | 5/2002 |
| JP | 2003046944 | 2/2003 |
| JP | 2003235044 | 8/2003 |
| KR | 100213018 | 8/1999 |
| KR | 20010030916 | 4/2001 |
| WO | WO0150770 | 7/2001 |
| WO | WO03026315 | 3/2003 |

OTHER PUBLICATIONS

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264:

(56) References Cited

OTHER PUBLICATIONS

Advanced video coding for generic audiovisual services". H.264. International Telecommunication Union. Version 12. Dated Jul. 30, 2010.
"VP8 Data Format and Decoding Guide". WebM Project. Google On2. Dated: Dec. 1, 2010.
Bankoski et al. "VP8 Data Format and Decoding Guide; draft-bankoski-vp8-bitstream-02" Network Working Group. Dated May 18, 2011.
Bankoski et al. "Technical Overview of VP8, An Open Source Video Codec for the Web". Dated Jul. 11, 2011.
Bankoski, J., Koleszar, J., Quillio, L., Salonen, J., Wilkins, P., and Y. Xu, "VP8 Data Format and Decoding Guide", RFC 6386, Nov. 2011.
Mozilla, "Introduction to Video Coding Part 1: Transform Coding", Video Compression Overview, Mar. 2012, 171 pp.
Park, Jun Sung, et al., "Selective Intra Prediction Mode Decision for H.264/AVC Encoders", World Academy of Science, Engineering and Technology 13, (2006).
Auyeung C. et al.:"parallel processing friendly simplified context selection of significance map", 4.JCT-VC Meeting; 95. MPEG Meeting; Jan. 20, 2011-Jan. 28, 2011; Daegu; (Joint Collaborative Team on Video Coding of IS/IEC JTC1/SC29/WG11 and ITU-T SG.16); URL:http://wftp3.itu.int/AV-ARCH/JCTVC-SITE/, No. JCTVC-D260, Jan. 16, 2011, all pages.
Canadian Office Action in CA2810899, related to U.S. Appl. No. 13/253,385, mailed Jan. 25, 2015.
Chenjie Tu et al., "Context-Based Entropy of Block Transform Coefficients for Image Compression" IEEE 11, No. 11, Nov. 1, 2002, pp. 1271-1283.
ISR & Written Opinion in Application # PCT/US2012/024608; mailed Jun. 5, 2012.
ISR and Written Opinion of the International Searching Authority, for Int'l Application No. PCT/US2012/020707; Feb. 15, 2012, 15 pages.
J-R Ohm, et al., "Report of the 4th JCT-VC Meeting", JCT-VC Meeting, Jan. 24, 2011.
Lou J, et al., "On Context Selection for Significant_Coeff_Flag Coding", 96. MPEG Meeting Mar. 21-Mar. 25, 2011, JCTVC-E362.
Lou, Jian, et al., "Parallel Processing Friendly Context Modeling for Significance Map Coding in CABAC",4.JCT-VC Meeting; 95. MPEG Meeting; Jan. 20, 2011-Jan. 28, 2011; Daegu; (Joint Collaborative Team on Video Coding of IS/IEC JTC1/SC29/WG11 and ITU-T SG.16); URL:http://wftp3.itu.int/AV-ARCH/JCTVC-SITE/, No. JCTVC-D241, Jan. 19, 2011, all pages.
Marpe et al., Context-Based Adaptive Binary Arithmetic Coding in the H.264/AVC Video Compression Standard, Detlev marpe, IEEE Transactions on Circuits and Systems for Video Technology, vol. 13, No. 7, Jul. 2003, 17 pages.
Richardson, "H.264/MPEG-4 Part 10: Introduction to CABAC," Oct. 17, 2002.
Sole, et al., Parallel Context Processing for the significance map in high coding efficiency. Joel Sole, JCTVC_D262, ver 1, 2011-01016.
Sze V, et al.,"CE11: Simplified context selection for significan t_coeff_flag (JCTVC-C227)", JCT_VC Meeting, Jan. 15, 2011.
Vadim Seregin, et al., "Low-Complexity Adaptive Coefficients Scanning", Joint Collaborative Team on Video Coding (JCT-VC) of ITU-T SG16 WP3 and ISO/IEC JTC1/SC29 WG11, vol. JCTCV-C205, Oct. 2, 2010, all pages.
Wiegand, et al., Overview of th H.264/AVC Video Coding Standard, IEEE Transactions on Circuits and Systems for Video Technology, p. 1-19, Jul. 2003.
Wiegand, Thomas, Study of Final Committee Draft of Joint Video Specification (ITU-T Rec. H.264 | ISO/IEC 14496-10 AVC), Joint Video Team (JVT) of ISO/IEC MPEG & ITU-T VCEG (ISO/IEC JTC1/SC29/WG11 and ITU-T SG16 Q.6), JVT-F100, Dec. 5, 2002.
Winken (Fraunhofer HHI) M. et al., "Description of Video Coding Technology Proposal by Fraunhoffer HHI", 1. JCT-VC Meeting Apr. 15, 2010-Apr. 23, 2010; Dresden; (Joint Collaborative Team on Video Coding of IS/IEC JTC1/SC29/WG11 and ITU-T SG.16); JCTVC-A116, URL:http://wftp3.itu.int/AV-ARCH/JCTVC-SITE/, No. 24 Apr. 2010, all pages.

\* cited by examiner

| 99 | 81 | 42 | 0 |
|----|----|----|---|
| 87 | 57 | 6  | 0 |
| 61 | 11 | 0  | 0 |
| 9  | 0  | 0  | 0 |

SPATIAL PROXIMITY CONTEXT ENTROPY CODING

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

BRIEF SUMMARY

Disclosed herein are aspects of systems, methods, and apparatuses for encoding and decoding of a video signal using spatial proximity context entropy coding.

An aspect is a method for spatial proximity context entropy coding which may include identifying a plurality of transform coefficients for a current block of a current frame of a video stream, wherein the plurality of transform coefficients is ordered based on a scan order, identifying a current transform coefficient from the plurality of transform coefficients, identifying a plurality of context coefficients from the plurality of transform coefficients, wherein each context coefficient from the plurality of context coefficients is spatially proximate to the current transform coefficient and is available for entropy coding the current transform coefficient, identifying an entropy coding probability for the current transform coefficient based on the scan order and the plurality of context coefficients, entropy coding the current transform coefficient based on the entropy coding probability, including the entropy coded current transform coefficient in an output bitstream, and storing or transmitting the output bitstream.

Another aspect is a method for spatial proximity context entropy coding which may include identifying a plurality of transform coefficients for a current block of a current frame of a video stream, wherein each transform coefficient from the plurality of transform coefficients has a respective position in a scan order and a respective location in a transform coefficient matrix, and entropy coding each transform coefficient from the plurality of transform coefficients in scan order. Entropy coding each transform coefficient from the plurality of transform coefficients in scan order may include identifying a current transform coefficient from the plurality of transform coefficients, the current transform coefficient having a position in the scan order and a location in the transform coefficient matrix, identifying a plurality of context coefficients from the plurality of transform coefficients based on the location of the current transform coefficient and a relative location of each transform coefficient from the plurality of transform coefficients independently of the position of the current transform coefficient in the scan order and a relative position of each transform coefficient from the plurality of transform coefficients in the scan order, wherein each context coefficient from the plurality of context coefficients is spatially proximate to the current transform coefficient and is available for entropy coding the current transform coefficient, identifying an entropy coding probability for the current transform coefficient based on the plurality of context coefficients, identifying a token representing the current transform coefficient based on entropy coding probability, and including the token in an output bitstream. The method of spatial proximity context entropy coding may include storing or transmitting the output bitstream.

Another aspect is a method for spatial proximity context entropy coding which may include identifying a plurality of transform coefficients for a current block of a current frame of a video stream, wherein each transform coefficient from the plurality of transform coefficients has a respective position in a scan order and a respective location in a transform coefficient matrix, and entropy coding the plurality of transform coefficients in scan order such that a first transform coefficient from the plurality of transform coefficients has a location in the transform coefficient matrix that is immediately adjacent a location in the transform coefficient matrix of a second transform coefficient from the plurality of transform coefficients, and such that a difference between a position of the first transform coefficient in the scan order and a position of the second transform coefficient is greater than two, and such that an entropy coding probability for the first transform coefficient is adjusted based on the second transform coefficient.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein:

FIG. 6 is a diagram of an example of a quantized transform coefficient matrix in accordance with implementations of this disclosure;

DETAILED DESCRIPTION

Video compression schemes may include breaking each image, or frame, into smaller portions, such as blocks, and generating an output bitstream using techniques to limit the information included for each block in the output. An encoded bitstream can be decoded to re-create the blocks and the source images from the limited information. Coding a video stream can include entropy coding, which is a lossless compression technique that may include substituting tokens, or codewords, for bit patterns, or symbols, in the output data stream.

In some entropy coding techniques, the token for a given symbol may be determined based a prediction of the probability of the symbol appearing in the stream. For example, symbols predicted to appear most frequently in the data stream may be replaced with the shortest tokens, thereby reducing the number of bits utilized to store or transmit the stream. In some entropy coding schemes, the predicted probability for encoding a current symbol may be adapted based on the symbol encoded immediately before the current symbol in scan order. However, in some implementations, adapting the probability predictions for encoding a current symbol based on the symbol encoded immediately before the current symbol in scan order may be inefficient.

Spatial proximity context entropy coding may improve entropy coding efficiency by using spatial correlations between proximate transform coefficients for adapting the entropy coding predictions. For example, context coefficients, which may include one or more previously transformed and encoded transform coefficients spatially near a current transform coefficient, may be identified independent of the scan order and may be used in predicting a probability distribution that will most efficiently encode the current transform coefficient.

Figure 1:
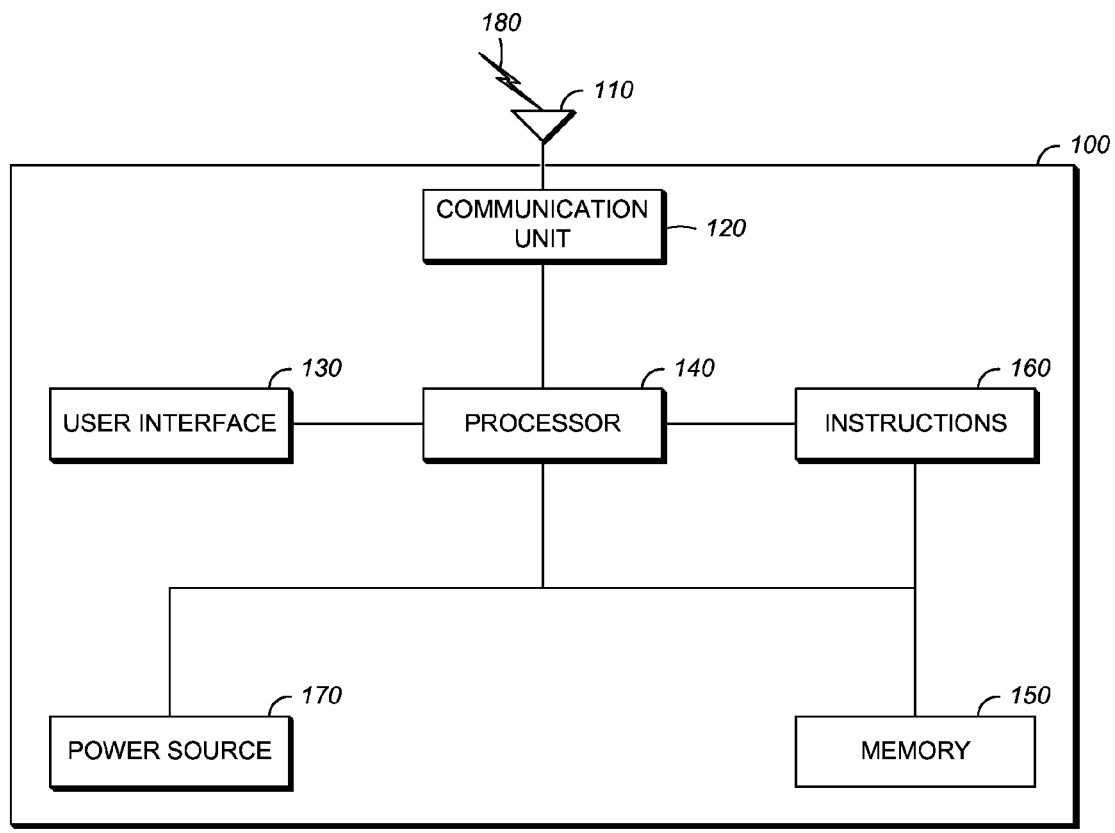
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a general purpose processor, a special purpose processor, a conventional processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
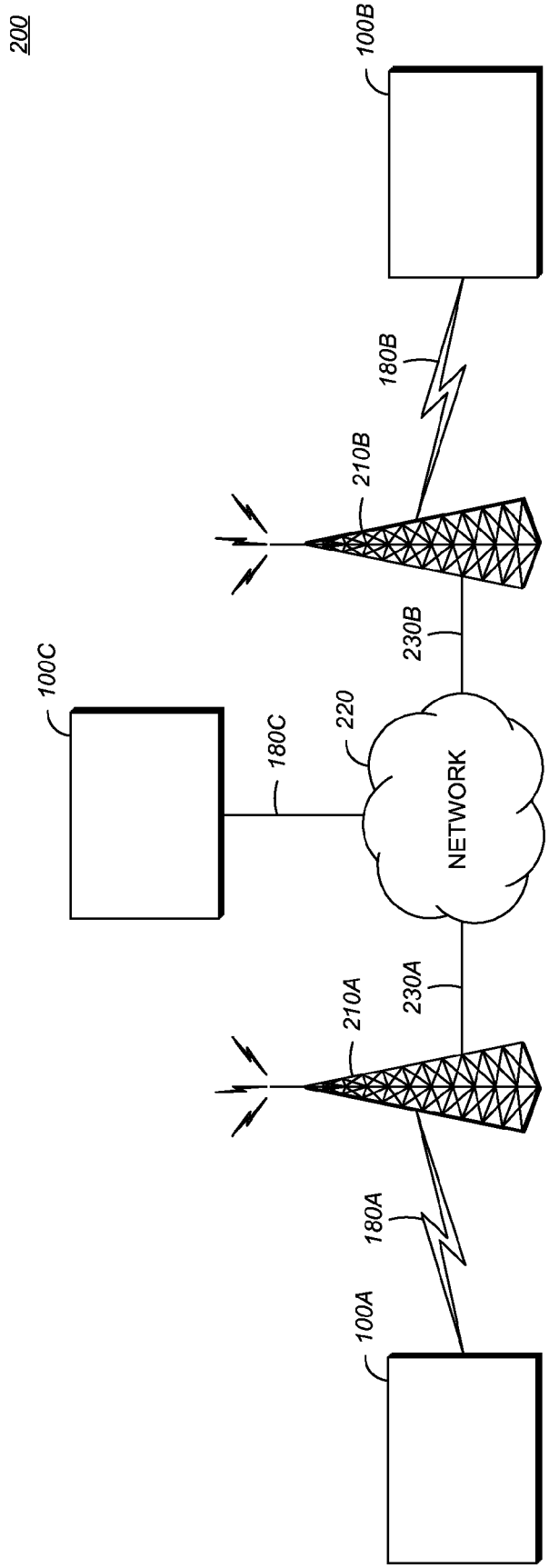
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
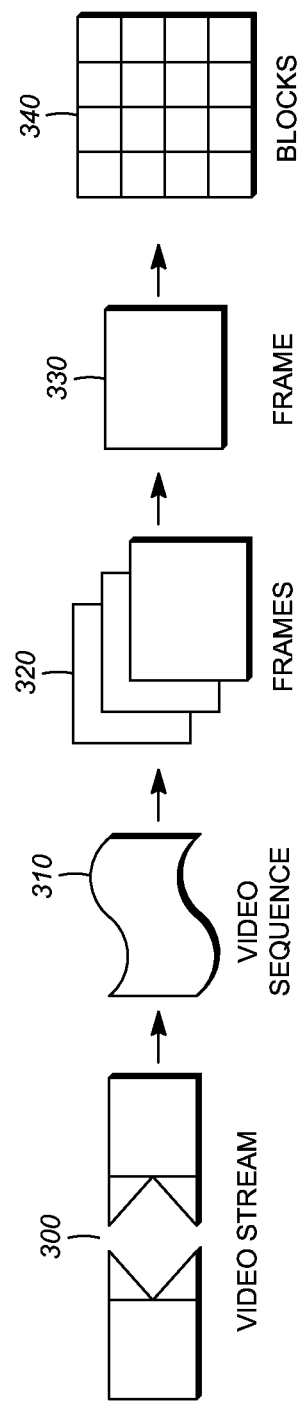
FIG. 3 is a diagram of a video stream for use in encoding, decoding, frame interpolation, or any combination thereof, in accordance with implementations of this disclosure.

FIG. 3 is a diagram of a video stream 300 for use in encoding, decoding, frame interpolation, or any combination thereof, in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
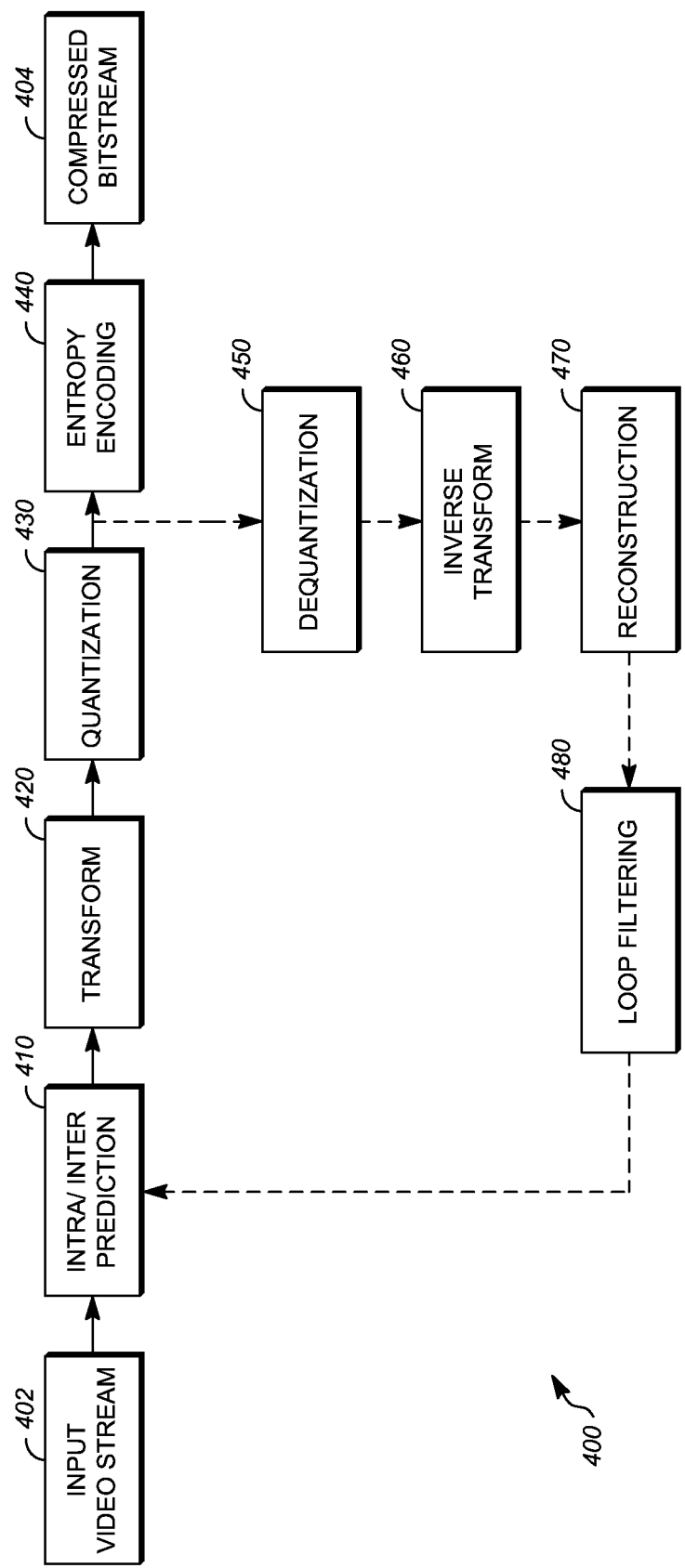
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3 to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference block in the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), and the Singular Value Decomposition Transform (SVD). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels.

The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
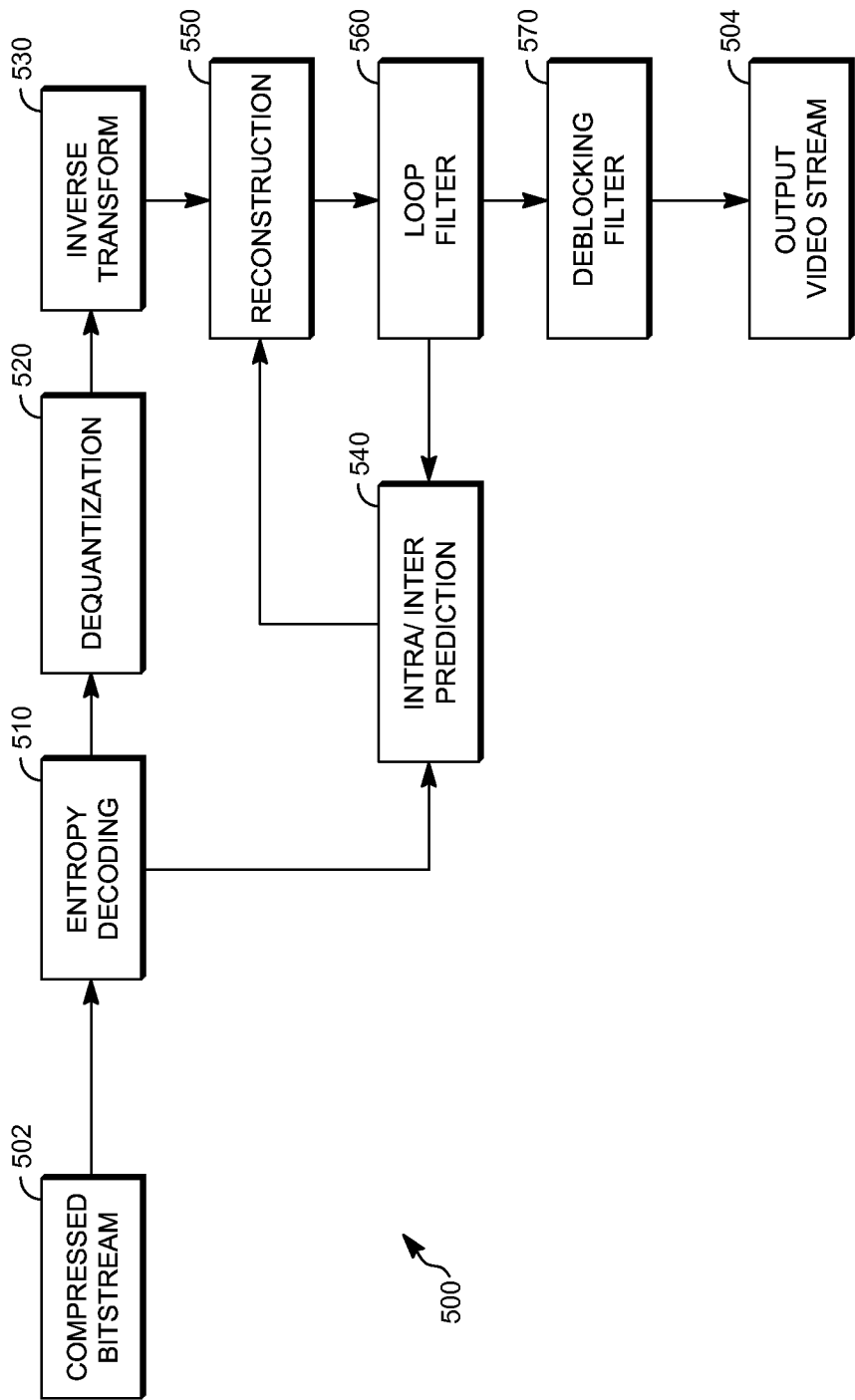
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a reconstructed block. The loop filtering unit 480 can be applied to the reconstructed block to reduce distortion, such as blocking artifacts.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to decode video data as described herein. The decoder 400 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond with the derivative residual block generated by the inverse transformation unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a reconstructed block. The loop filtering unit 560 can be applied to the reconstructed block to reduce blocking artifacts. The deblocking filtering unit 570 can be applied to the reconstructed block to reduce blocking distortion, and the result may be output as the output video stream 504.

Other variations of the decoder 500 can be used to decode the compressed bitstream 502. For example, the decoder 500 can produce the output video stream 504 without the deblocking filtering unit 570.

Figure 6:
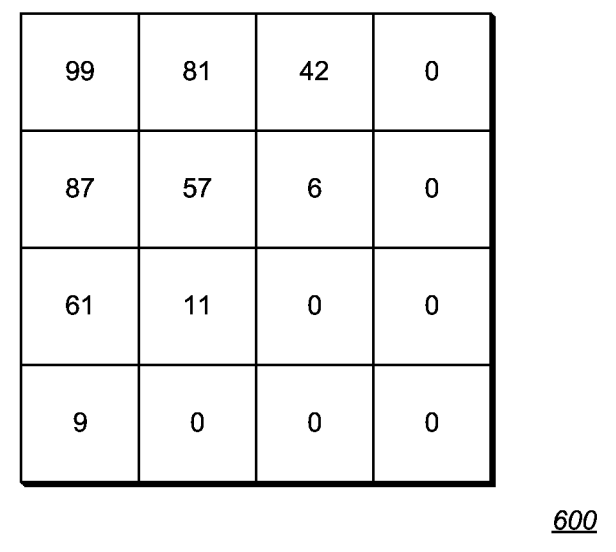

FIG. 6 is a diagram of an example of a quantized transform coefficient matrix 600 including a 4×4 block of quantized transform coefficient values in accordance with implementations of this disclosure. For example, an element of an encoder, such as the quantization unit 430 of the encoder 400 shown in FIG. 4, may generate the quantized transform coefficient matrix 600. Although a 4×4 block is shown for simplicity, any size block may be used. For example, a 64×64 block, a 64×32 block, a 32×64 block, a 32×32 block, a 32×16 block, a 16×32 block, a 16×16 block, a 16×8 block, an 8×16 block, an 8×8 block, an 8×4 block, or a 4×8 block, may be used.

In FIG. 6, the value shown in each location indicates the transform coefficient value for the respective location. For clarity, the location of a transform coefficient for a block may be referred to as the "position," "location," or variations thereof, of the transform coefficient. As used herein references to "proximity," "spatial proximity," or "distance" between transform coefficients may indicate proximity or distance in the transform coefficient matrix representation of the transform coefficients for a block. Although the transform coefficients are described with relation to a transform coefficient matrix, the transform coefficients may be processed or stored in any data structure. For example, the transform coefficients may be processed or stored in a one dimensional array, such as a vector.

In some implementations, a transform, such a symmetric DCT, may tend to group coefficients having large magnitudes in the upper left corner of the block 500 as shown. In some implementations, a transform can distribute larger magnitude coefficients in a different pattern. For example a one dimensional asymmetric discrete sine transform (ADST) combined with a one dimensional DCT may tend to group large magnitude coefficients along one edge of the block, such as the top edge or the left edge.

In some implementations, the matrix of quantized transformed coefficients may be processed in a scan order that tends to group the zero value coefficients at the end of the block and consecutive zero value coefficients at the end of a block in scan order may be omitted from the output bitstream without loss of data. Although not explicitly shown, the two dimensional (2D) transform coefficient matrix may be may be represented by a one dimensional vector array.

Figure 7:
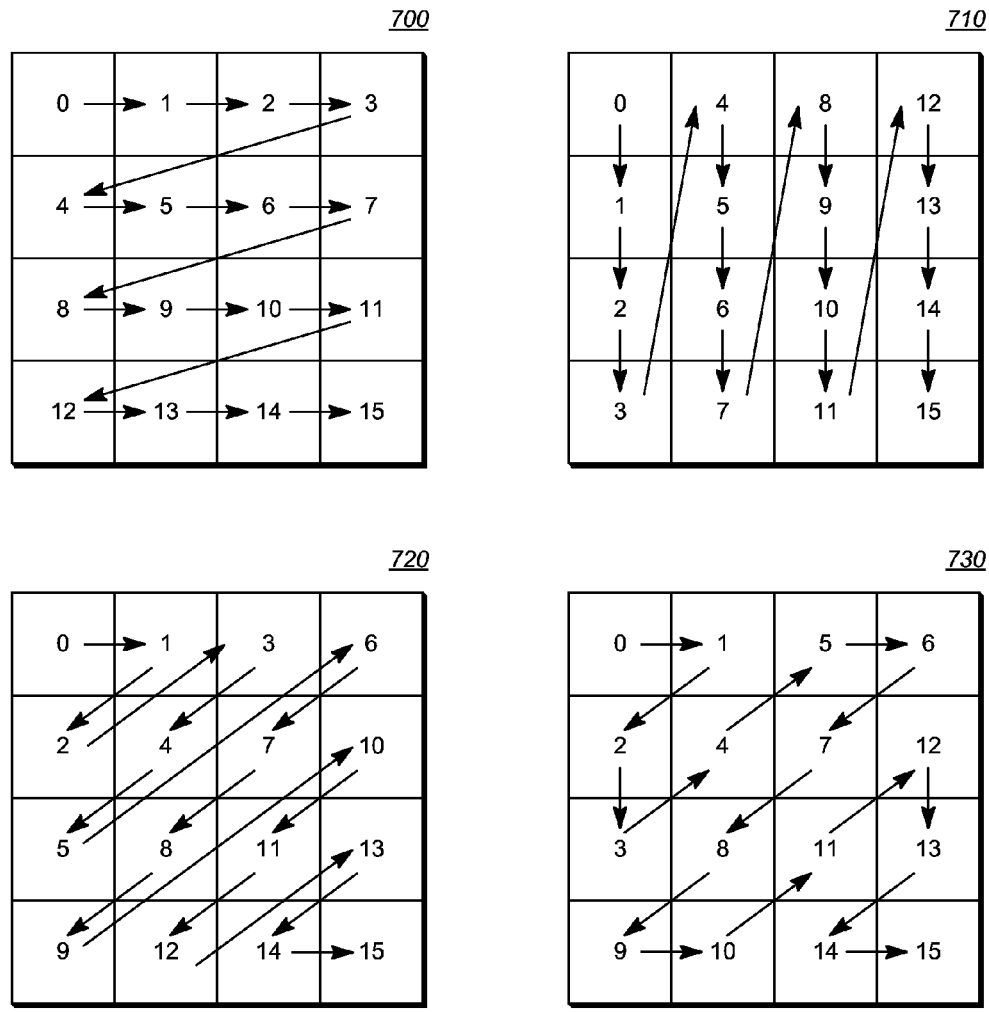
FIG. 7 shows diagrams of examples of entropy coding scan orders in accordance with implementations of this disclosure.

FIG. 7 shows diagrams of examples of entropy coding scan orders in accordance with implementations of this disclosure. In some implementations, spatial proximity context entropy coding may include encoding the coefficients of a quantized transform coefficient matrix, such as the quantized transform coefficient matrix 600 shown in FIG. 6, in a scan order, such as a horizontal scan order 700, a vertical scan order 710, a diagonal scan order 720, or a zigzag scan order 730. In FIG. 7, the values shown in each block represent the order that the corresponding coefficient is entropy coded. Although a 4×4 block is shown for simplicity, any size block may be used. For example, a 64×64 block, a 64×32 block, a 32×64 block, a 32×32 block, a 32×16 block, a 16×32 block, a 16×16 block, a 16×8 block, an 8×16 block, an 8×8 block, an 8×4 block, or a 4×8 block, may be used.

In some implementations, encoding the coefficients of a transform coefficient matrix in a scan order may include generating a one dimensional array, such as a vector, of the transform coefficients by including each transform coefficient in the vector in scan order. For example, the DC coefficient, which may be the coefficient in the top left corner of the transform coefficient matrix may be the first element of the scan order vector, may have a transform coefficient matrix location of (0,0) and may have a scan order position of (0). As used herein, the terms "order," "scan position," "vector position," or variations thereof of a transform coefficient indicate a relative position, or index, of the transform coefficient in the scan order or the scan order vector.

Figure 8:
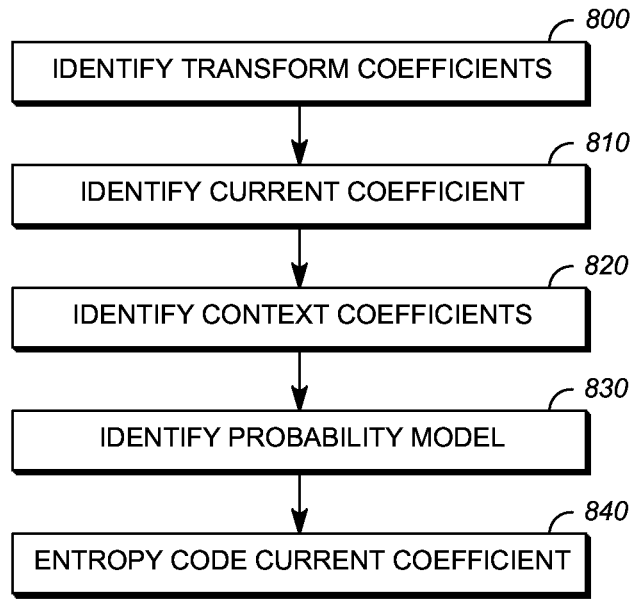
FIG. 8 is a flow diagram of spatial proximity context entropy encoding in accordance with an implementation of this disclosure.

FIG. 8 is a flow diagram of spatial proximity context entropy encoding in accordance with an implementation of this disclosure. In some implementations, spatial proximity context entropy coding can be implemented in an encoder, such as encoder 400 shown in FIG. 4, of a device, such as the computing device 100 shown in FIG. 1 or the computing and communication devices 100A/100B/100C shown in FIG. 2, as, for example, a computer software program stored in a data storage unit, such as the memory 150 shown in FIG. 1.

In some implementations, spatial proximity context entropy coding may include encoding a stream of video data having multiple frames, each having multiple blocks. The video data or stream can be received by the computing device in any number of ways, such as by receiving the video data over a network, over a cable, or by reading the video data from a primary memory or other storage device, including a disk drive or removable media such as a CompactFlash (CF) card, Secure Digital (SD) card, or any other device capable of communicating video data. In some implementations, video data can be received from a video camera connected to the computing device operating the encoder.

In some implementations, spatial proximity context entropy coding may include identifying transform coefficients for a current block of a current frame at 800, identifying a current transform coefficient at 810, identifying context coefficients for the current transform coefficient at 820, identifying an entropy coding probability for the current transform coefficient at 830, entropy coding the current transform coefficient at 840, or a combination thereof.

In some implementations, transform coefficients for a current block of a current frame may be identified at 800. For example, identifying the transform coefficients may include generating, reading, receiving, or otherwise distinguishing a block of transform coefficients, such as the block of transform coefficients 600 shown in FIG. 6, associated with a current block of a current frame. In some implementations, transform coefficients may be numerical values formed by processing pixels of a block of a frame of a video stream to form transform coefficients, by a unit of an encoder, such as transform unit 420 shown in FIG. 4. Although referred to as 'transform coefficients' or 'coefficients' for simplicity, the transform coefficients may be quantized transform coefficients, such as the quantized transform coefficients generated by quantization unit 430 shown in FIG. 4.

In some implementations, the transform coefficients may be ordered based on a scan order, such as the zigzag scan order 730 shown FIG. 7. For example, an ordered one dimensional array, or vector, of transform coefficients may be generated from a two dimensional matrix of transform coefficients by including coefficients in the vector in scan order.

In some implementations, a current transform coefficient may be identified at 810. For example, spatial proximity context entropy coding may include processing the transform coefficients in scan order, and identifying a current transform coefficient may include identifying the next coefficient in scan order. In some implementations, the current transform coefficient may be a zero value transform coefficient, the current block of transform coefficients may not include a subsequent non-zero value transform coefficient, and entropy coding for the current block may be complete.

In some implementations, context coefficients for the current transform coefficient may be identified at 820. In some implementations, the probability distribution for entropy coding the current coefficient may be adapted based on the context coefficients.

In some implementations, the context coefficients may include previously entropy coded coefficients from the current frame that are spatially proximate to the current coefficient. For example, the context coefficients may include previously entropy coded transform coefficients that are spatially proximate to the current coefficient in the current block of transform coefficients, such as the coefficient immediately to the left of the current coefficient, the coefficient immediately above the current coefficient, or the coefficient immediately above and to the left of the current coefficient.

In some implementations, the probability distribution may be adapted based on the quantized transform coefficient value. In some implementations, the probability distribution may be adapted based on the token value. In some implementations, a mapping between a quantized transform coefficient to a token may be a many-to-one mapping. For example, encoding using a token may include encoding bits to specify the quantized transform coefficient from among the many quantized transform coefficients mapped to the token. In an example, a decoder may identify quantized transform coefficient values for previously decoded coefficients and the context may be a function of the quantized transform coefficients. In another example, the context may be a function of the tokens.

In some implementations, context coefficients identified for the current coefficient may depend on the spatial location of the current coefficient in the transform coefficient matrix. For example, the current coefficient may be the top-left coefficient in the transform coefficient matrix and identifying context coefficients may be omitted.

In some implementations, the current coefficient may be in the top row of the transform coefficient matrix, previously entropy coded coefficients above the current coefficient may not be available and previously entropy coded coefficients to the left of the current coefficient may be identified as the context coefficients. For example, the current coefficient may be the coefficient in the first row and third column of the transform coefficient matrix, and the context coefficients may include the coefficient in the first row and second column and the coefficient in the first row and first column of the transform coefficient matrix.

In some implementations, the current coefficient may be in the leftmost column of the transform coefficient matrix, previously entropy coded coefficients to the left of the current coefficient may not be available and previously entropy coded coefficients above the current coefficient may be identified as the context coefficients. For example, the current coefficient may be the coefficient in the third row and first column of the transform coefficient matrix, and the context coefficients may include the coefficient in the second row and first column and the coefficient in the first row and first column of the transform coefficient matrix.

In some implementations, the probability may be adapted based on a function of the context coefficients. For example, for the current coefficient X, the context (Context(X)) may be identified as a function (F) of previously entropy coded coefficients (A, B, . . . ) which may be expressed as the following:

$$\text{Context}(X) = F(A, B, \ldots) \qquad \text{[Equation 1]}$$

For example, the function F may be an average of the magnitudes of the coefficients, a maximum of the magnitudes of the coefficients, a mean of the base 2 logarithms of the magnitudes of the coefficients, or a maximum of the base 2 logarithms of the magnitudes of the coefficients.

In some implementations, an entropy coding probability for the current transform coefficient may be identified at 830. For example, the entropy coding probability, or probability model, may be identified from a set of probability models. In some implementations, the probability model may be identified based on a magnitude of the context coefficients, or the function F of the context coefficients. For example, the magnitude of the function F may be large, and a probability model for entropy coding large values may be identified. In another example, the magnitude of the function F may be small, and a probability model for entropy coding small values may be identified.

In some implementations, identifying a probability model at 830 may include adapting the probability model based on the context coefficients, or the function F of the context coefficients. For example, a baseline probability may be adjusted based on the context.

In some implementations, the current transform coefficient may be entropy coded at 840. In some implementations, entropy coding the current transform coefficient at 840 may include identifying a token, or codeword, for the current coefficient based on the probability model identified at 830. In some implementations, entropy coding the current transform coefficient at 840 may include including the entropy coded current transform coefficient in an output bitstream, such as the compressed bitstream 404 shown in FIG. 4.

For example, the token for the current coefficient may be included in the output bitstream to represent the current coefficient. In some implementations, entropy coding the current transform coefficient at 840 may include storing or transmitting the output bitstream. For example, the encoded video bitstream, including the token representing the entropy coded current transform coefficient, may be transmitted as a signal via a network, such as the network 220 shown in FIG. 2, such that a device, such as the computing device 100 shown in FIG. 1 or the computing and communication devices 100A/100B/100C shown in FIG. 2, which may include a decoder, such as the decoder 500 shown in FIG. 5, may receive the signal via the network, may decode the encoded video bitstream, and may generate a reconstructed frame, or a portion of a reconstructed frame, corresponding to the current frame.

In another example, the encoded video bitstream, including the token representing the entropy coded current transform coefficient, may be stored in a memory, such as the memory 150 shown in FIG. 1, of a device, such as the computing device 100 shown in FIG. 1 or the computing and communication devices 100A/100B/100C shown in FIG. 2, as a stored encoded video, such that the device, or any other device capable of accessing the memory, may retrieve the stored encoded video, such that a decoder, such as the decoder 500 shown in FIG. 5, may decode the encoded video, and may generate a reconstructed frame, or a portion of a reconstructed frame, corresponding to the current frame.

Other implementations of the diagram of spatial proximity context entropy encoding as shown in FIG. 8 are available. In implementations, additional elements of spatial proximity context entropy encoding can be added, certain elements can be combined, and/or certain elements can be removed. For example, in an implementation, spatial proximity context entropy encoding can include an additional element involving generating spatial proximity context entropy coding models, or the element at 830 can be skipped and/or omitted for one or more blocks.

Figure 9:
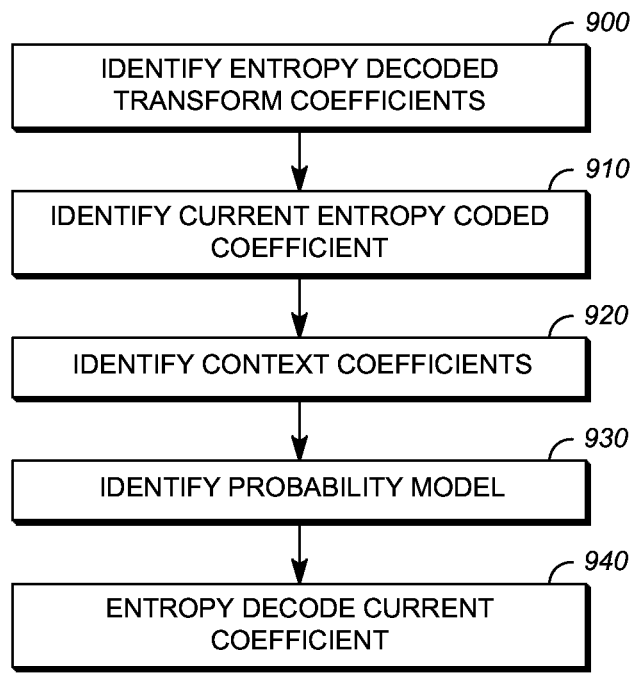
FIG. 9 is a flow diagram of spatial proximity context entropy decoding in accordance with an implementation of this disclosure.

FIG. 9 is a flow diagram of spatial proximity context entropy decoding in accordance with an implementation of this disclosure. In some implementations, spatial proximity context entropy coding can be implemented in an decoder, such as decoder 500 shown in FIG. 5, of a device, such as the computing device 100 shown in FIG. 1 or the computing and communication devices 100A/100B/100C shown in FIG. 2, as, for example, a computer software program stored in a data storage unit, such as the memory 150 shown in FIG. 1.

In some implementations, spatial proximity context entropy coding may include identifying entropy decoded transform coefficients for a current block of a current frame at 900, identifying a current entropy coded transform coefficient at 910, identifying context coefficients for the current entropy coded transform coefficient at 920, identifying an entropy coding probability for the current entropy coded transform coefficient at 930, entropy coding the current entropy coded transform coefficient at 940, or a combination thereof.

Although not explicitly shown in FIG. 9, spatial proximity context entropy decoding may include receiving a signal including an encoded video stream, or a portion of an encoded video stream, via a network, such as the network 220 shown in FIG. 2, or retrieving an encoded video stream, or a portion of an encoded video stream, from a memory, such as such as the memory 150 shown in FIG. 1. For simplicity, as used herein, receiving may include receiving via a network, retrieving from memory, or otherwise ascertaining the identified information.

In some implementations, entropy decoded transform coefficients for a current block of a current frame may be identified at 900. For example, identifying the entropy decoded transform coefficients at 900 may include identifying a current block of a current frame of a current video stream, and generating the entropy decoded transform coefficients for the current block from the encoded video stream.

In some implementations, identifying the entropy decoded transform coefficients may include identifying a scan order for the current block. For example, the encoded video stream may be received as a one dimensional array, or vector, of tokens, or codewords, wherein each token represents an encoded transform coefficient of the current block in a scan order. For example, the token corresponding to the transform coefficient in the top-left location of a transform coefficient matrix may be the first token received and entropy decoded, and the next token in scan order may be the next token received and entropy decoded. In some implementations, identifying the entropy decoded transform coefficients may include identifying a location for each entropy decoded transform coefficient in a transform coefficient matrix for the current block based on the order the entropy decoded transform coefficient is received and the scan order.

In some implementations, a current entropy coded transform coefficient may be identified at 910. For example, a current token, or codeword, representing the current entropy coded transform coefficient may be identified in the received encoded bitstream. In some implementations, identifying the current entropy coded transform coefficient at 910 may include identifying a location of the transform coefficient represented by the current token in the transform coefficient matrix for the current block. For example, the current token may be received as part of a one dimensional sequence, or vector array, and a location of the corresponding transform coefficient in the transform coefficient matrix for the current block may be identified based on the scan order for the current block. For simplicity, the transform coefficient represented by the current token may be referred to as the current transform coefficient or the current coefficient.

In some implementations, context coefficients for entropy decoding the current transform coefficient from the current token may be identified at 920. In some implementations, the current token may be entropy decoded based on a probability distribution, and the probability distribution for entropy decoding the current coefficient may be adapted based on the context coefficients.

In some implementations, the context coefficients may include previously entropy decoded coefficients from the current frame that are spatially proximate to the location of the current transform coefficient in the transform coefficient matrix. For example, the context coefficients may include previously entropy decoded transform coefficients that are spatially proximate to the location of the current coefficient in the current block of transform coefficients, such as the coefficient immediately to the left of the location of the current coefficient, the coefficient immediately above the location of the current coefficient, or the coefficient immediately above and to the left of the location of the current coefficient.

In some implementations, the context coefficients for entropy decoding the current coefficient may identified based on the spatial location of the current coefficient in the transform coefficient matrix. For example, the current coefficient may be the top-left coefficient in the transform coefficient matrix and identifying context coefficients may be omitted.

In some implementations, the current coefficient may be in the top row of the transform coefficient matrix, previously entropy decoded coefficients above the current coefficient may not be available and previously entropy decoded coefficients to the left of the current coefficient may be identified as the context coefficients. For example, the current coefficient may be the coefficient in the first row and third column of the transform coefficient matrix, and the context coefficients may include the entropy decoded coefficient in the first row and second column and the entropy decoded coefficient in the first row and first column of the transform coefficient matrix.

In some implementations, the current coefficient may be in the leftmost column of the transform coefficient matrix, previously entropy decoded coefficients to the left of the current coefficient may not be available and previously entropy decoded coefficients above the current coefficient may be identified as the context coefficients. For example, the current coefficient may be the coefficient in the third row and first column of the transform coefficient matrix, and the context coefficients may include the entropy decoded coefficient in the second row and first column and the entropy decoded coefficient in the first row and first column of the transform coefficient matrix.

In some implementations, the probability distribution may be adapted based on a function of the context coefficients. For example, for the current coefficient X, the context (Context (X)) may be identified as a function (F) of previously entropy decoded coefficients (A, B, . . . ) which may be expressed as shown in Equation 1. For example, the function F may be the mean of log 2 of the magnitudes of the coefficients. In another example, the function F may be the max of the log 2 of the magnitudes of the coefficients.

In some implementations, an entropy decoding probability for entropy decoding the current transform coefficient may be identified at 930. For example, the entropy decoding probability, or probability model, may be identified from a set of probability models. In some implementations, the probability model may be identified based on a magnitude of the context coefficients, or the function F of the context coefficients. For example, the magnitude of the function F may be large, and a probability model for entropy decoding large values may be identified. In another example, the magnitude of the function F may be small, and a probability model for entropy decoding small values may be identified.

In some implementations, identifying a probability model at 930 may include adapting the probability model based on the context coefficients, or the function F of the context coefficients. In some implementations, the probability model identified at 930 may match the probability model used for encoding the current coefficient, such as the probability model identified at 830 as shown in FIG. 8.

In some implementations, the current transform coefficient may be entropy decoded at 940. In some implementations, entropy decoding the current transform coefficient at 940 may include identifying a value of the current transform coefficient based on the current token and the probability model identified at 930. In some implementations, entropy decoding the current transform coefficient may include including the value of the current transform coefficient in the transform coefficient matrix for the current block at the location identified for the current transform coefficient at 910.

Although not shown in FIG. 9, spatial proximity context entropy decoding may be performed for each coefficient in the transform coefficient matrix for the current block, and an output video stream, such as the output video stream 504 shown in FIG. 5, or a portion of the output video stream, may be generated based on the transform coefficient matrix for the current block as shown in FIG. 5. For example, the transform coefficient matrix for the current block may be output to a dequantization unit, such as the dequantization unit 520 shown in FIG. 5, or may be stored in a memory, such as the memory 150 shown in FIG. 1. In some implementations, the decoded video stream may be output to a presentation unit, such as the user interface 130 shown in FIG. 1, for display.

Other implementations of the diagram of spatial proximity context entropy decoding as shown in FIG. 9 are available. In implementations, additional elements of spatial proximity context entropy decoding can be added, certain elements can be combined, and/or certain elements can be removed. For example, in an implementation, spatial proximity context entropy decoding can include an additional element involving generating spatial proximity context entropy coding models, or the element at 930 can be skipped and/or omitted for one or more blocks.

Figure 10:
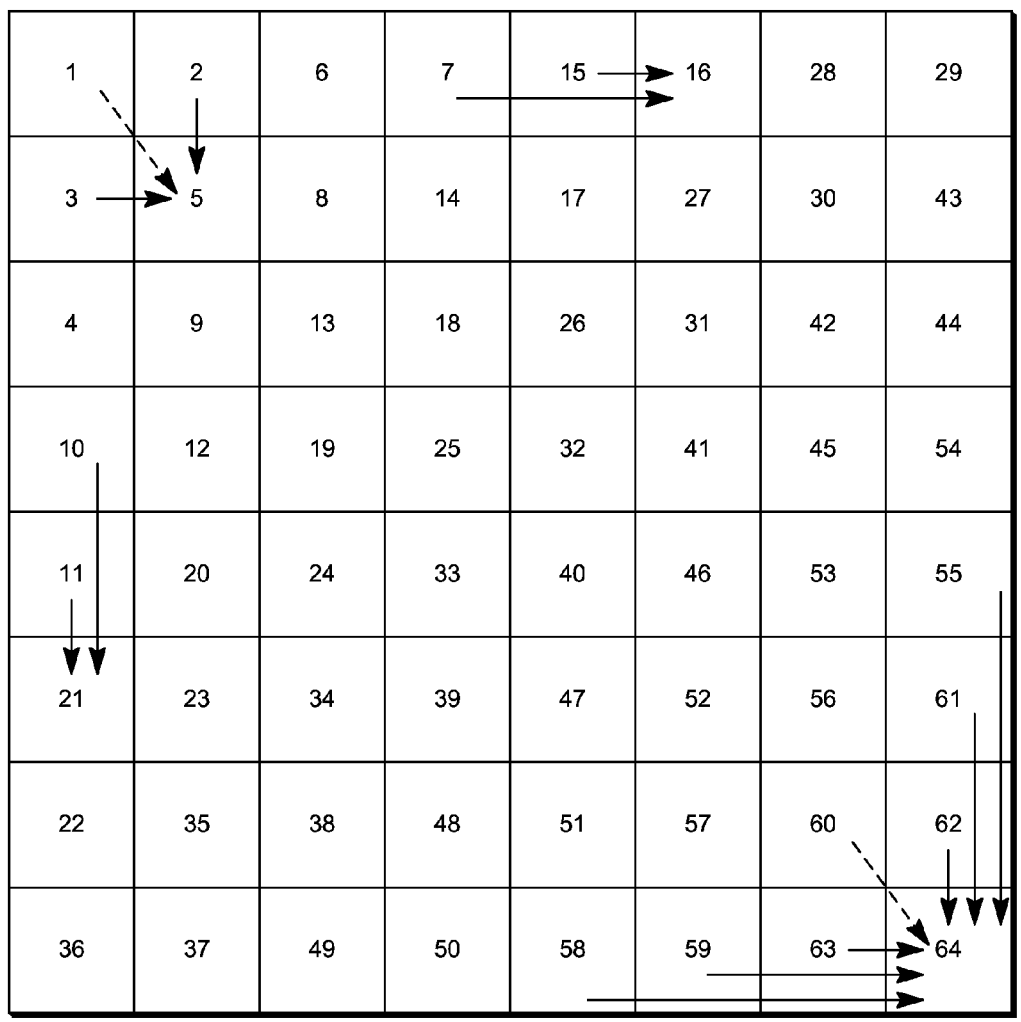
FIG. 10 is a diagram of an example of a portion of a spatial proximity context entropy coding context model in accordance with implementations of this disclosure.

FIG. 10 is a diagram of an example of a portion of a spatial proximity context entropy coding context model in accordance with implementations of this disclosure. In some implementations, spatial proximity context entropy coding may include determining the number, or cardinality, of context coefficients to include in the context coefficients, and may include determining the spatial locations, with respect to the current coefficient, in the transform coefficient matrix of the transform coefficients to include in the context coefficients. In some implementations, a spatial proximity context entropy coding context model may indicate the cardinality and location of context coefficients to use for encoding a block of transform coefficients.

In some implementations, one or more spatial proximity context entropy coding context models may be identified from a set of spatial proximity context entropy coding context models based on metrics, such as a location of current coefficient, a size of the transform coefficient matrix, the content of the current video stream, the scan order used for entropy coding the current block, the type of transform or combination of transforms used for generating the transform coefficients, or a combination thereof.

For example, FIG. 10 shows an example of a portion of a spatial proximity context entropy coding context model using a zigzag scan order for an 8×8 matrix 1000 of transform coefficients generated using a symmetric DCT. In FIG. 10, the context coefficients for a block are indicated using arrows. In some implementations, one or more of the context coefficients may be omitted. For example, the context coefficients indicated using broken lines may be omitted in some implementations.

In some implementations, the probabilities for entropy coding a current transform coefficient in a row other than the top row and a column other than the left column, such as the transform coefficient corresponding to the fifth position in the zigzag scan order shown, may be adapted based on a function of the transform coefficient immediately above the current transform coefficient, which may be the second position in the zigzag scan order, the transform coefficient immediately to the left of the current transform coefficient, which may be the third position in the zigzag scan order, the transform coefficient immediately above and to the left of the current transform coefficient, which may be the first position in the zigzag scan order, or a combination thereof.

In some implementations, the probabilities for entropy coding a current transform coefficient in the top row, such as the transform coefficient corresponding to the 16th position in the zigzag scan order shown, may be adapted based on a function of the transform coefficient immediately to the left of the current transform coefficient, which may be the 15th position in the zigzag scan order, the transform coefficient two locations to the left of the current transform coefficient, which may be the seventh position in the zigzag scan order, or a combination thereof.

In some implementations, the probabilities for entropy coding a current transform coefficient in the leftmost column, such as the transform coefficient corresponding to the 21st position in the zigzag scan order shown, may be adapted based on a function of the transform coefficient immediately above the current transform coefficient, which may be the 11th position in the zigzag scan order, the transform coefficient two locations above the current transform coefficient, which may be the tenth position in the zigzag scan order, or a combination thereof.

In some implementations, the correlation between a coefficient and spatially proximate coefficients may be low. For example, the distance, such as the Manhattan distance, of the location of the coefficient from the DC coefficient of the current block, which may be the coefficient in the top-left location of the current block, may be large and the correlation between the coefficient and spatially proximate coefficients may be low. In some implementations, the probabilities for entropy coding a current transform coefficient with relatively low correlation, such as the transform coefficient corresponding to the 64th position in the zigzag scan order shown, may be adapted based on a function of the three transform coefficients immediately above the current transform coefficient, which may be the 62nd position, the 61st position, and the 55th position in the zigzag scan order, the three transform coefficient immediately to the left of the current transform coefficient, which may be the 63rd position, the 59th position, and the 58th position, in the zigzag scan order, the transform coefficient immediately above and to the left of the current transform coefficient, which may be the 60th position in the zigzag scan order, or a combination thereof.

In some implementations, spatial proximity context entropy coding may include identifying one or more spatial proximity context entropy coding context models based on the content of the current video stream. For example, spatial proximity context entropy coding context models may be generated based on one or more content types. For example, a set of spatial proximity context entropy coding context models may be generated based on a set of video streams including a first type of content, such as the content of a movie, and another set of spatial proximity context entropy coding context models may be generated based on another a set of video streams including another type of video content, such as video conferencing video streams, and the set of spatial proximity context entropy coding context models identified for coding a current video stream may be determined based on a similarity between the type of content of the current video stream and type of content used to generate the respective spatial proximity context entropy coding context models.

In some implementations, spatial proximity context entropy coding may include identifying one or more spatial proximity context entropy coding context models based on the transform, or combination of transforms, used to generate the transform coefficients. For example, the Figures described herein show examples based on generating the transform coefficients using a symmetric DCT, which may tend to group coefficients having large magnitudes in the upper left corner of the block. Although not shown separately, other transforms, or combinations of transforms, may be used. For example, generating the transform coefficients may include using an ADST in the horizontal direction and using a DCT in the vertical direction, which may tend to increase vertical correlation, and decrease horizontal correlation, among the transform coefficients.

In some implementations, spatial proximity context entropy coding may include identifying one or more spatial proximity context entropy coding context models based on the scan order. For example, the transform coefficients may be entropy coded in a zigzag scan order, as shown in FIG. 10, and the context coefficients may include the transform coefficient located immediately above and the transform coefficient located immediately to the left of the location of the current coefficient. In another example, the transform coefficients may be entropy coded in a vertical scan order, as shown at 710 in FIG. 7, and the context coefficients may include the transform coefficient located immediately above the location of the current coefficient and may omit the transform coefficient located to the left of the location of the current coefficient. In another example, the transform coefficients may be entropy coded in a horizontal scan order, as shown at 700 in FIG. 7, and the context coefficients may include the transform coefficient located immediately to the left of the location of the current coefficient and may omit the transform coefficient located above the location of the current coefficient.

In some implementations, such as implementations wherein the transform coefficients have high vertical correlation and low horizontal correlation, the transform coefficient in the location immediately to the left of the current location may be omitted from the context coefficient, and, for example, the coefficient in the location immediately above, or the coefficients in the two locations immediately above the current location may be included in the context coefficients.

Figure 11:
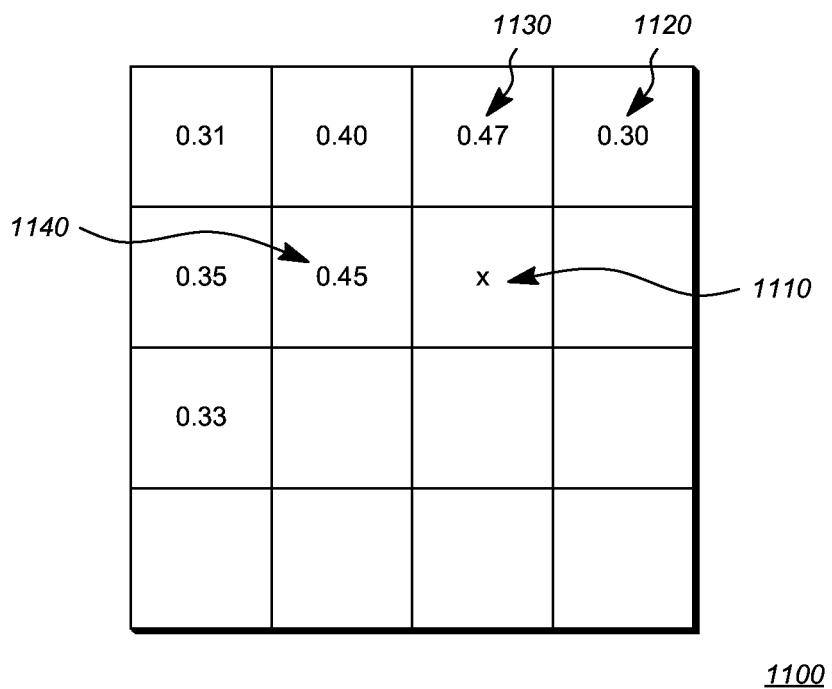
FIGS. 11-13 are diagrams of examples of identifying spatial proximity context entropy coding context models in accordance with implementations of this disclosure.
Figure 12:
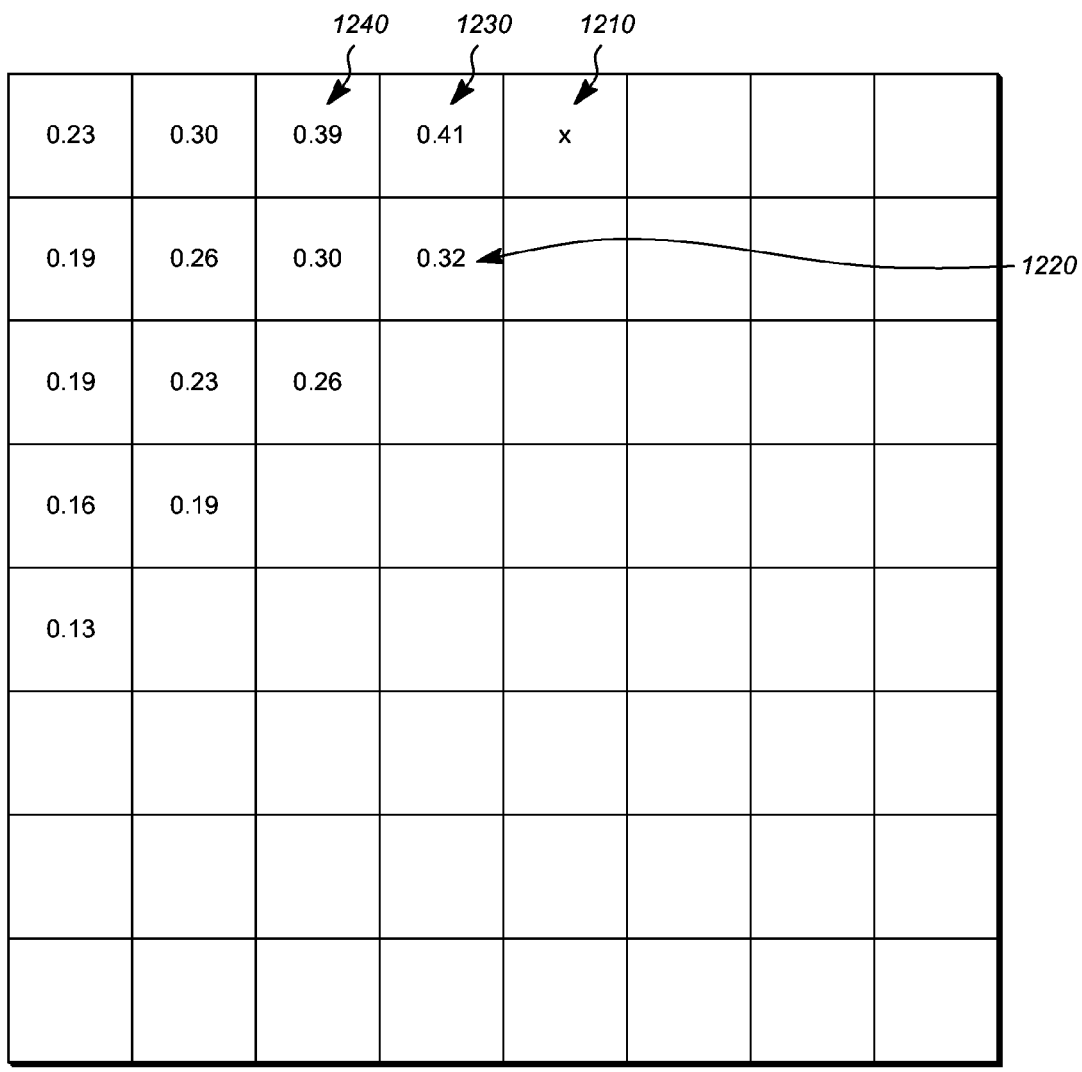
Figure 13:
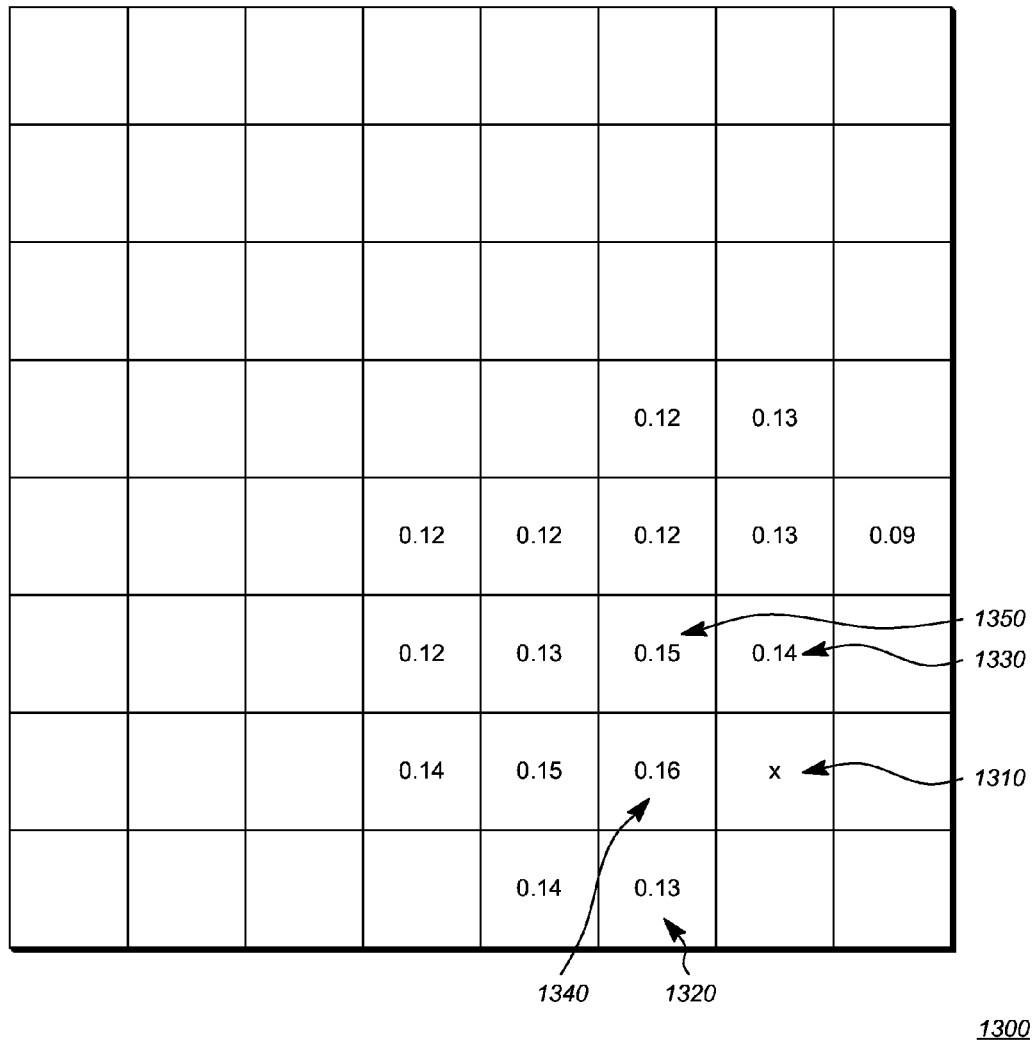

FIGS. 11-13 are diagrams of examples of identifying spatial proximity context entropy coding context models in accordance with implementations of this disclosure. In some implementations, spatial proximity context entropy coding may include identifying one or more spatial proximity context entropy coding context models. For example, identifying the context coefficients at 820/920 may include identifying the spatial proximity context entropy coding context models.

In some implementations, spatial proximity context entropy coding may include generating one or more spatial proximity context entropy coding context models. For example, models may be identified based, at least in part, on metrics, such as a location of current coefficient, a size of the transform coefficient matrix, the content of the current video stream, the scan order used for entropy coding the current block, the type of transform, or combination of transforms, used for generating the transform coefficients, correlations between transform coefficients, or a combination thereof. In some implementations, the correlation between transform coefficients may be identified based on a statistical analysis of a set of video streams.

For example, as shown in FIG. 11, a 4×4 block 1100 may include a target coefficient location X 1110, and a correlation value for each location in the transform coefficient matrix preceding the position of the target coefficient in a zigzag scan order, wherein the correlation values represent a statistical correlation between the respective locations and the target location based on the set of video streams. For example, the location 1120 of the transform coefficient immediately preceding the position of the target location 1110 in scan order has a statistical correlation of 0.30, the spatially proximate location 1130 immediately above the target location 1110 has a statistical correlation of 0.47, the spatially proximate location 1140 immediately to the left of the target location 1110 has a statistical correlation of 0.45. In some implementations, the spatially proximate transform coefficient 1130 immediately above the target location 1110 and the spatially proximate location 1140 immediately to the left of the target location 1110 may be identified as the locations to include in the spatial proximity context entropy coding context model for the target location, the identified transform coefficient matrix size, and the identified scan order.

In another example, as shown in FIG. 12, an 8×8 block 1200 may include a target coefficient location X 1210, and a correlation value for each location in the transform coefficient matrix preceding the position of the target coefficient location in a zigzag scan order, wherein the correlation values represent a statistical correlation between the respective locations and the target location based on the set of video streams. For example, the scan order position of the location 1220 immediately preceding the target location 1210 in scan order has a statistical correlation of 0.32, the spatially proximate location 1230 immediately to the left of the target location 1210 has a statistical correlation of 0.41, and the spatially proximate location 1240 two locations to the left of the target location 1210 has a statistical correlation of 0.39. In some implementations, the spatially proximate transform coefficient 1230 immediately to the left of the target location 1210 and the spatially proximate location 1240 two blocks to the left of the target location 1210 may be identified as the locations to include in the spatial proximity context entropy coding context model for the target location, the identified transform coefficient matrix size, and the identified scan order.

In another example, as shown in FIG. 13, an 8×8 block 1300 may include a target coefficient location X 1310, and a correlation value for each location in the transform coefficient matrix preceding the position of the target coefficient location in a zigzag scan order, wherein the correlation values represent a statistical correlation between the respective locations and the target location based on the set of video streams. For example, the scan order position of the location 1320 immediately preceding the scan order position of the target location 1310 in scan order has a statistical correlation of 0.13, the spatially proximate location 1330 immediately above the target location 1310 has a statistical correlation of 0.14, the spatially proximate location 1340 immediately to the left of the target location 1310 has a statistical correlation of 0.16, and the spatially proximate location 1350 immediately above and to the left of the target location 1310 has a statistical correlation of 0.15. In some implementations, the spatially proximate transform coefficient 1330 immediately above the target location 1310, the spatially proximate location 1340 immediately to the left of the target location 1310, and the spatially proximate location 1350 immediately above and to the left of the target location 1310 may be identified as the locations to include in the spatial proximity context entropy coding context model for the target location, the identified transform coefficient matrix size, and the identified scan order. For simplicity, in FIG. 13 correlation values for some positions preceding the position of the target location, such as positions having statistically low correlation values, are omitted.

In some implementations, the number and location of the coefficients to include in the context coefficients may be based on the size of the transform coefficient block, the distance, such as the Manhattan distance, of the current location from the DC coefficient of the current block, which may be the coefficient in the top-left location of the current block, or based on the size of the block and the distance between the current location and the DC coefficient. For example, the correlation between proximate locations may decrease as the distance of the current location from the DC coefficient increases. In another example, the correlation between proximate locations may decrease as the size of the transform coefficient matrix increases.

In some implementations, the transform coefficient matrix may be a relatively small transform coefficient matrix, such as a 4×4 transform coefficient matrix, and two spatially proximate coefficients may be used as context coefficients, as shown in FIG. 11. In some implementations, the distance from the current location to the DC coefficient may be relatively small, and two spatially proximate coefficients may be used as context coefficients, as shown in FIG. 12. In some implementations, the distance from the current location to the DC coefficient may be relatively large, and three spatially proximate coefficients may be used as context coefficients, as shown in FIG. 13. In some implementations, such as implementations where the transform coefficient matrix is large and the distance from the current location to the DC coefficient is large, each available transform coefficient in a block of transform coefficients, such as a 2×2 block or a 3×3 block, above and to the left of the current location may be identified as context coefficients.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, isolating, selecting, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be used to implement a method in accordance with the disclosed subject matter.

The implementations of the transmitting station 100A and/or the receiving station 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, implementations of portions of the transmitting station 100A and the receiving station 100B may differ.

Further, in one implementation, for example, the transmitting station 100A or the receiving station 100B can be implemented using a general purpose computer or general purpose/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The transmitting station 100A and receiving station 100B can, for example, be implemented on computers in a real-time video system. In addition or alternatively, the transmitting station 100A can be implemented on a server and the receiving station 100B can be implemented on a device separate from the server, such as a hand-held communications device. In this instance, the transmitting station 100A can encode content using an encoder 400 into an encoded video signal and transmit the encoded video signal to the communications device. In turn, the communications device can then decode the encoded video signal using a decoder 500. In addition or alternatively, the communications device can decode content stored locally on the communications device, for example, content that was not transmitted by the transmitting station 100A. Other suitable transmitting station 100A and receiving station 100B implementation schemes are available. For example, the receiving station 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:
identifying a plurality of transform coefficients for a current block of a current frame of a video stream, wherein the plurality of transform coefficients is ordered based on a scan order;
identifying a current transform coefficient from the plurality of transform coefficients, wherein the plurality of transform coefficients are quantized at more than one bit;
identifying a plurality of context coefficients from the plurality of transform coefficients, wherein each context coefficient from the plurality of context coefficients is spatially proximate to the current transform coefficient in a transform coefficient matrix and is available for entropy coding the current transform coefficient;
identifying an entropy coding probability for the current transform coefficient based on the scan order and the plurality of context coefficients;
entropy coding the current transform coefficient based on the entropy coding probability;
including the entropy coded current transform coefficient in an output bitstream; and
storing or transmitting the output bitstream.

2. The method of claim 1, wherein identifying the plurality of transform coefficients includes identifying a transform coefficient matrix such that each transform coefficient from the plurality of transform coefficients has a respective location in the transform coefficient matrix and a respective position in the scan order.

3. The method of claim 2, wherein identifying the current transform coefficient includes identifying a position of the current transform coefficient in the scan order and a location of the current transform coefficient in the transform coefficient matrix.

4. The method of claim 2, wherein the current transform coefficient has a location in a topmost row of the transform coefficient matrix, and wherein the plurality of context coefficients includes:
a first context coefficient, wherein a location of the first context coefficient in the transform coefficient matrix is immediately to the left of the location of the current transform coefficient in the transform coefficient matrix; and
a second context coefficient, wherein a location of the second context coefficient in the transform coefficient matrix is two locations to the left of the location of the current transform coefficient in the transform coefficient matrix.

5. The method of claim 2, wherein the current transform coefficient has a location in a leftmost column of the transform coefficient matrix, and wherein the plurality of context coefficients includes:
a first context coefficient, wherein a location of the first context coefficient in the transform coefficient matrix is immediately above the location of the current transform coefficient in the transform coefficient matrix; and
a second context coefficient, wherein a location of the second context coefficient in the transform coefficient matrix is two locations above the location of the current transform coefficient in the transform coefficient matrix.

6. The method of claim 1, wherein the plurality of context coefficients includes:
a first context coefficient, wherein a location of the first context coefficient is immediately above a location of the current transform coefficient; and
a second context coefficient, wherein a location of the second context coefficient is immediately to the left of the location of the current transform coefficient.

7. The method of claim 6, wherein the plurality of context coefficients includes:
a third context coefficient, wherein a location of the third context coefficient is immediately above and to the left of the location of the current transform coefficient.

8. The method of claim 1, wherein the plurality of context coefficients includes a block of transform coefficients, wherein the block of transform coefficients has a location immediately above and to the left of a location of the current transform coefficient such that each transform coefficient from the block of transform coefficients has a location above and to the left of a location of the current transform coefficient.

9. The method of claim 1, wherein identifying the entropy coding probability for the current transform coefficient based on the scan order and the plurality of context coefficients includes adapting the entropy coding probability for the current transform coefficient based on a function of the plurality of context coefficients.

10. The method of claim 1, wherein identifying the plurality of context coefficients includes identifying a cardinality of the plurality of context coefficients and a location of each context coefficient.

11. The method of claim 1, wherein identifying the plurality of context coefficients includes identifying the plurality of context coefficients based on a spatial distance between the current transform coefficient and a DC transform coefficient of the current block.

12. The method of claim 1, wherein identifying the plurality of context coefficients includes identifying the plurality of context coefficients based on the scan order.

13. The method of claim 1, wherein identifying the plurality of context coefficients includes identifying the plurality of context coefficients based on a cardinality of the plurality of transform coefficients.

14. The method of claim 1, wherein identifying the plurality of context coefficients includes identifying the plurality of context coefficients based on a transform type for the current block.

15. The method of claim 1, wherein identifying the plurality of context coefficients includes identifying the plurality of context coefficients based on a content type of the video stream.

16. The method of claim 1, wherein identifying the plurality of context coefficients includes identifying the plurality of context coefficients such that a difference between a position of a context coefficient from the plurality of context coefficients in the scan order and a position of the current transform coefficient in the scan order is greater than 1.

17. The method of claim 1, wherein identifying the plurality of context coefficients includes identifying the plurality of context coefficients based on the spatial location of the current transform coefficient and a relative spatial location of each transform coefficient from the plurality of transform coefficients independently of the scan order position of the current transform coefficient and the relative scan order position of each transform coefficient from the plurality of transform coefficients.

18. A method comprising:
- identifying a plurality of transform coefficients for a current block of a current frame of a video stream, wherein each transform coefficient from the plurality of transform coefficients has a respective position in a scan order and a respective location in a transform coefficient matrix;
- entropy coding each transform coefficient from the plurality of transform coefficients in scan order by:
  - identifying a current transform coefficient from the plurality of transform coefficients, the current transform coefficient having a position in the scan order and a location in the transform coefficient matrix,
  - identifying a plurality of context coefficients from the plurality of transform coefficients based on the location of the current transform coefficient and a relative location of each transform coefficient from the plurality of transform coefficients independently of the position of the current transform coefficient in the scan order and a relative position of each transform coefficient from the plurality of transform coefficients in the scan order, wherein each context coefficient from the plurality of context coefficients is spatially proximate to the current transform coefficient and is available for entropy coding the current transform coefficient, and wherein the plurality of transform coefficients are quantized at more than one bit,
  - identifying an entropy coding probability for the current transform coefficient based on the plurality of context coefficients,
  - identifying a token representing the current transform coefficient based on entropy coding probability, and including the token in an output bitstream; and
- storing or transmitting the output bitstream.

19. A method comprising:
- identifying a plurality of transform coefficients for a current block of a current frame of a video stream, wherein each transform coefficient from the plurality of transform coefficients has a respective position in a scan order and a respective location in a transform coefficient matrix, and wherein the plurality of transform coefficients are quantized at more than one bit; and
- entropy coding the plurality of transform coefficients in scan order such that a first transform coefficient from the plurality of transform coefficients has a location in the transform coefficient matrix that is immediately adjacent a location in the transform coefficient matrix of a second transform coefficient from the plurality of transform coefficients, and such that a difference between a position of the first transform coefficient in the scan order and a position of the second transform coefficient is greater than two, and such that an entropy coding probability for the first transform coefficient is adjusted based on the second transform coefficient.

* * * * *